United States Patent
Schneider et al.

(10) Patent No.: US 12,434,906 B2
(45) Date of Patent: Oct. 7, 2025

(54) PRESSURELESS WATER TANK FOR OPERATION IN AN AIRCRAFT, AIRCRAFT SECTION AND AIRCRAFT HAVING A WATER TANK

(71) Applicant: Airbus Operations GmbH, Hamburg (DE)

(72) Inventors: Frank Schneider, Hamburg (DE); Frederik Albers, Ahlerstedt (DE)

(73) Assignee: Airbus Operations GmbH, Hamburg (DE)

( * ) Notice: Subject to any disclaimer, the term of this patent is extended or adjusted under 35 U.S.C. 154(b) by 85 days.

(21) Appl. No.: 18/239,266

(22) Filed: Aug. 29, 2023

(65) Prior Publication Data

US 2024/0076120 A1 Mar. 7, 2024

(30) Foreign Application Priority Data

Sep. 2, 2022 (EP) .................................. 22193732

(51) Int. Cl.
| | |
|---|---|
| B65D 88/54 | (2006.01) |
| B65D 90/32 | (2006.01) |
| F16K 3/03 | (2006.01) |
| F16K 17/19 | (2006.01) |

(52) U.S. Cl.
CPC .............. B65D 90/32 (2013.01); *F16K 3/03* (2013.01); *F16K 17/19* (2013.01); *F16K 2200/202* (2021.08)

(58) Field of Classification Search
CPC ..... B64D 11/0007; B64D 11/02; E03B 11/02; E03B 7/075; E03B 7/078; B65D 90/32; Y10T 137/6906; F16K 17/19; F16K 17/196; F16K 3/03
See application file for complete search history.

(56) References Cited

U.S. PATENT DOCUMENTS

| | | | | |
|---|---|---|---|---|
| 3,150,683 | A * | 9/1964 | Carolan | G05D 16/0613 137/493 |
| 6,273,286 | B1 * | 8/2001 | Segrest, III | F16K 17/19 220/203.26 |
| 6,305,412 | B1 * | 10/2001 | Steele | F16K 17/196 137/853 |
| 9,475,582 | B2 * | 10/2016 | Mackulin | B64D 11/02 |
| 9,611,627 | B2 * | 4/2017 | Schreiner | F02C 9/18 |

(Continued)

FOREIGN PATENT DOCUMENTS

| | | |
|---|---|---|
| EP | 3861895 A1 | 8/2021 |
| WO | 0019024 A1 | 4/2000 |

OTHER PUBLICATIONS

European Search Report for Application No. 22193732 dated Feb. 24, 2023.

(Continued)

*Primary Examiner* — Michael R Reid
(74) *Attorney, Agent, or Firm* — KDW Firm PLLC

(57) ABSTRACT

A water tank for operation in an aircraft includes a rigid tank shell, and a pressure compensation mechanism to equalize a pressure inside of the rigid tank shell with an environment. The pressure compensation mechanism includes a shutoff member to move between a closed position, a first open position allowing air to enter the rigid tank shell and a second open position allowing air to leave the rigid tank shell.

19 Claims, 5 Drawing Sheets

(56) References Cited

U.S. PATENT DOCUMENTS

| | | | |
|---|---|---|---|
| 9,995,321 B2* | 6/2018 | Lynn | F16K 17/06 |
| 10,815,007 B2* | 10/2020 | Bis | B64F 1/36 |
| 2004/0211482 A1 | 10/2004 | Brooker | |
| 2010/0006570 A1* | 1/2010 | Borras Llompart | F16K 17/196 220/89.1 |
| 2010/0084030 A1 | 4/2010 | MacKulin | |

OTHER PUBLICATIONS

European Decision to Grant EP Application No. 22193732.9, dated Feb. 27, 2025, 2 pages.

* cited by examiner

PRESSURELESS WATER TANK FOR OPERATION IN AN AIRCRAFT, AIRCRAFT SECTION AND AIRCRAFT HAVING A WATER TANK

TECHNICAL FIELD

The present disclosure generally relates to water tanks for operation in an aircraft. Specifically, the present disclosure relates to a potable, waste or grey water tank having a pressure compensation mechanism equalizing a pressure inside of the water tank with a surrounding environment, as well as an aircraft section and an aircraft having such water tank.

BACKGROUND

Currently, potable water in an aircraft is transported in special tanks or containers. In order to provide the potable water to a consumer, such as a galley, lavatory or the like, the interior of the tank is pressurized. For instance, bleed air from an aircraft engine or other compressed air is usually fed into the tank, so that the built-up pressure facilitates conveying the water towards the consumers through a distribution network for water.

This does not only require energy consuming bleed air from the aircraft engines. Moreover, the tank itself has to be designed and formed to withstand the pressure in the tank. This is usually achieved by providing a tank having a spherical form or a cylindrical form with spherical ends. This special form of the tank requires additional space in the aircraft, since the tank cannot be placed anywhere in the aircraft. For instance, special brackets surrounding such tank are required for transportation and installation of the tank. In addition, the shell of the tank is dimensioned relatively thick, in order to withstand the pressurization.

Thus, water storage in an aircraft requires a lot of space for storage, has a high weight, and has a negative influence on the energy consumption.

SUMMARY

It is thus an object of the present disclosure to provide an improved water tank, as well as an aircraft section and aircraft having such a tank.

This object is solved by the disclosure herein. Preferred embodiments are described herein.

According to a first aspect to better understand the present disclosure, a water tank configured for operation in an aircraft comprises a rigid tank shell and a pressure compensation mechanism configured to equalize a pressure inside of the rigid tank shell with an environment. A rigid tank shell is to be understood as a shell forming a tank that delimits a fixed internal volume for storing water. The size of the shell does not change (significantly) when the tank shell is empty or filled with water or another liquid. In other words, a rigid tank shell distinguishes over a flexible tank shell, such as a bladder.

An environment of the tank or the rigid tank shell is to be understood as a direct environment surrounding the rigid tank shell, such as a storage or cargo area of a vehicle, in which the tank is installed. The environment of the tank can further mean a more general surrounding, such as an environment of the vehicle, in which the tank is installed.

The water tank can be used for storage of potable water. Alternatively, the water tank can be used to store waste, such as toilet waste, or grey water, such as waste water from sinks in a lavatory or galley, that can be reused for other purposes.

Furthermore, since the water tank has a pressure compensation mechanism, the water, other liquid or waste is stored without being pressurized. This allows building the tank of a lighter and thinner material, since the tank shell does not have to withstand the interior pressure as with pressurized water tanks or a high exterior pressure acting on the tank. It is to be understood that the rigid tank shell can withstand a (positive and negative) pressure that may occur during normal operation of the tank. The maximum to-be-expected pressure built-up is during filling the tank from a pressurized source or in case of an unexpected pressure drop in an environment of the tank or inside of the tank (e.g., in case a drain port or the like has a defect). However, such pressure occurrence is of only short duration and with a reduced peak (compared to conventional tanks) due to the pressure compensation mechanism.

Any brackets as in conventional tanks may have a simplified structure, so that they are lighter, or can even be omitted entirely. This further allows building the tank in any desired form, irrespective of any pressure-optimized spherical or cylindrical shape. As a mere example, the shape of the rigid tank shell may at least in portions follow, surround or encase other components in the surrounding environment of the tank. Thus, the tank can be arranged in any desired place of the aircraft, such as between stringers, frames, ducts, tanks or other primary structure and secondary structure elements. This saves a significant amount of space in the aircraft, while storage space for water can even be increased.

In the water tank, the pressure compensation mechanism comprises a shutoff member configured to move between a closed position, a first open position allowing air to enter the rigid tank shell and a second open position allowing air to leave the rigid tank shell. Thus, a pressure inside of the rigid tank shell can be equalized, irrespective of a pressure (development) inside and outside of the shell.

As mere examples, in an aircraft, the pressure outside of the shell, such as in a storage or cargo area of the aircraft, may decrease when the aircraft reaches a higher altitude. The shutoff member moving into the second open position allows a pressure equalization of the interior of the shell with respect to the surrounding environment, so that no increased pressure builds up in the tank. Likewise, if the water level in the tank raises or sinks, such as during filling of the tank and removing water from the tank, respectively, an increasing/decreasing pressure inside of the shell can be avoided by the shutoff member moving into the second position or first position, respectively. In any case, a pressure equalization is easily achieved, which ensures that the rigid tank shell does not need to be built to withstand high pressures, be it a positive or negative pressure relative to the surrounding environment. Thus, the water tank can be built much lighter than conventional tanks. A high pressure means a pressure applied to a water tank in conventional tanks, where the interior of the tank is continuously pressurized to convey the water from the tank to a water consumer. It is to be understood, that the water tank of this disclosure is still designed to withstand critical cases with large pressure differences, such as during filling with an external pressure source or a sudden drop of pressure in the environment of the tank.

Since the water tank is not pressurized, there is no need for bleed air from the aircraft's engine(s). Thus, the disclosed water tank is particularly valuable for bleed-less aircrafts, i.e. aircrafts or aircraft engines designed to not provide bleed air. As a mere example, propeller engines or other (future) impellent may not have the capability of providing bleed air. Thus, the disclosed water tank can be employed with any type of engine.

Moreover, the shutoff member also avoids spilling of water out of the tank shell, when in the closed position. In other words, the shutoff member shuts off (closes) any passage from the interior of the rigid tank shell to the surrounding environment.

In a variant, the shutoff member can move into opposite directions from the closed position when achieving the first open position and the second open position. Specifically, when starting in the closed position, the shutoff member moves in a first direction towards the first open position. Moreover, when starting in the closed position, the shutoff member moves in a second direction towards the second open position, wherein the first and second direction are opposite to one another. As a mere example, the shutoff member can be configured to move towards an interior of the rigid tank shell, where it reaches the first open position, and to move towards an exterior of the rigid tank shell where it reaches the second open position.

Alternatively or additionally, the shutoff member can be configured to achieve a first degree of aperture in the first open position and to achieve a second degree of aperture in the second open position. A degree of aperture means the size of an opening evolving when the shutoff member moves from the closed position towards the first or second open position. In other words, the degree of aperture corresponds to the size of a cross-section of the opening or air passage way of the opened shutoff member. For instance, the first degree of aperture can be smaller than the second degree of aperture, so that in the second open position more air can stream through the opening in the rigid tank shell.

In another variant, the shutoff member can be a flap hinged on one side and configured to pivot in a first direction from the closed position towards the first open position and to pivot in a second direction from the closed position towards the second open position. For instance, the flap can be hinged to a portion of the rigid tank shell.

Alternatively, the shutoff member can be a flap hinged on one side and configured to pivot from the closed position towards the first and second open position in the same direction, for example, towards an interior or an exterior of the tank. For instance, the flap can be hinged to a portion of the rigid tank shell. As an example, the flap may achieve different degrees of aperture in the first and second open position.

In addition or alternatively, the flap can be configured to close an opening in the rigid tank shell, when the shutoff member is in the closed position. The opening in the rigid tank shell may be a dedicated opening for pressure equalization, i.e. for air moving inside or out of the rigid tank shell.

In any case, the flap can be configured to move to the first open position and the second open position depending on the required degree of aperture, i.e. depending on a rapidness of the pressure compensation, wherein the second open position having the larger degree of aperture allows faster pressure compensation than the first open position. It is further to be understood that the flap can be configured to move in any direction (towards the interior or exterior of the rigid shell tank) depending on the direction of pressure compensation. In other words, if an increased pressure in the interior of the rigid tank shell has to be compensated, the flap can move towards the exterior of the rigid tank shell, and if a negative pressure in the interior of the rigid tank shell develops, the flap can move towards the interior of the rigid tank shell. This can be applied for the first and second open position, only for the first open position or only for the second open position.

Alternatively or additionally, the shutoff member can be a diaphragm mechanism or membrane mechanism that is configured to open and close an opening in the rigid tank shell. When in the closed position, the diaphragm closes the opening in the rigid tank shell in an airtight manner. The first and second open positions can be positions of the diaphragm where it forms a smaller and a larger aperture, respectively. The opening in the rigid tank shell may be a dedicated opening for pressure equalization, i.e. for air moving inside or out of the rigid tank shell.

It is likewise possible to provide a flap with a diaphragm mechanism, for example, the diaphragm mechanism forming part of the flap and closing an opening in the flap. In this case, the diaphragm mechanism can open to achieve the first or second position, while the flap can open to achieve the other of the first or second position. As a mere example, opening the diaphragm allows air to enter the rigid tank shell, i.e. the shutoff member achieves the first open position. Opening the flap, for example, towards an exterior of the rigid tank shell allows air to leave the rigid tank shell, i.e. the shutoff member achieves the second open position. It is to be understood that the flap can also move towards the interior of the rigid tank shell, in order to achieve the second open position.

Also alternatively or additionally, the shutoff member can comprise an axially movable plug, configured to move between the closed position and the first and second open position. The plug can constitute a valve having a valve seat and a valve disc configured to close an opening at the valve seat. The valve disc (i.e., the movable block) can move from the closed position (contacting the valve seat) to the first open position achieving a first degree of aperture, and to also move to the second open position achieving a second degree of aperture. The movement to the first and second open position can be in the same direction or can be in opposite directions. In the letter case, the valve disc and valve seat may be configured in such a manner that the valve disc can move through the valve seat.

In a further variant, the pressure compensation mechanism can comprise an air filter arranged to cover an opening evolving when the shutoff member moves from the closed position to the first open position. As a mere example, the air filter may be arranged in the opening in the rigid tank shell, through which air streams into and out of the rigid tank shell. Thus, any dust, particles or other elements are prevented from entering the interior of the rigid tank shell. This ensures hygienic requirements for the potable water storage.

As another example, the air filter is connected to the shutoff member, such as the flap, and a portion of the rigid tank shell, so that the air filter spans between the shutoff member and the rigid tank shell, when the shutoff member moves into the first open position. The air filter may be mounted to the rigid tank shell in such a manner, that the shutoff member does not contact the air filter, when the flap moves into the second open position. This can be easily achieved if a movement of the shutoff member towards the second open position is in an opposite direction than when moving into the first open position. Likewise, if a movement of the shutoff member towards the second open position is in the same direction as when moving into the first open position, the shutoff member may move further from the first position, while the filter does not move (further). Thus, the air entering the interior of the rigid tank shell is filtered through the air filter, while air released from the interior of the rigid tank shell can move quickly in an opening next to the air filter, i.e., without being filtered, since there is no hygienic reason for filtering air leaving the tank.

As a further example, the shutoff member may be implemented as a double flap. The shutoff member can be formed as a flap configured to move to the second open position and comprises a further flap or other shutoff member configured to move to the first open position. For instance, the further flap can be smaller than the entire shutoff member (larger flap), wherein the further flap closes an opening in the shutoff member (larger flap), the opening comprising the air filter. Thus, when the further flap opens towards the first open position, air entering the rigid tank shell is filtered. When the entire shutoff member (the larger flap comprising the air filter covered by the further flap) moves into the second open position, the air filter is moved out of the way and an opening covered by the shutoff member appears allowing the air leaving the rigid tank shell.

In case the shutoff member is a diaphragm mechanism, the air filter may be arranged in such a manner, that an aperture of the diaphragm in the first open position is covered by the air filter, while an aperture of the diaphragm in the second open position is not covered by the air filter or is only partially covered by the air filter. For instance, the air filter may have a first size corresponding to the opening achieved by the diaphragm the first open position, while the diaphragm may achieve a larger opening in the second open position, so that a ring-shaped opening around the air filter allows air to leave the rigid tank shell unfiltered and, hence, in a fast manner.

In another variant, an opening or aperture of the shutoff member in the first open position and the second open position may have a different areal size, such as a different opening or aperture cross-section. As a mere example, the opening cross-section in the first open position is smaller than the open cross-section in the second open position. This increases safety measures of the pressure compensation mechanism. Specifically, in case of filling the tank, the air inside of the rigid tank shell has to quickly move out of the tank compared to air entering the rigid tank shell when water is removed and delivered to a consumer. Likewise, in an aircraft a drop of air pressure inside of the aircraft may occur, such as in case of a lack of cabin pressure. In such case, the pressure of the air inside of the tank rapidly increases compared to the drop of pressure in the surrounding of the tank, so that a fast removal of air out of the interior of the rigid tank shell is required. A larger opening cross-section helps removing the air from the inside of the tank in a fast manner, so that a fast pressure equalization can be achieved.

Likewise, a fast pressure equalization may be necessary if a pressure in the interior of the rigid tank shell drops. For instance, in order to fill the tank or remove (waste) water from the tank, there is usually a duct and valve arranged between the rigid tank shell and an exterior (skin) of the aircraft. In case of a failure, the interior of the rigid tank shell may unintentionally be fluidly connected to the exterior of the aircraft, where a low-pressure may be present, such as during flying at a high altitude. The pressure compensation mechanism is then able, to equalize the pressure in the interior of the tank.

In a further variant, the tank can further comprise a controller configured to receive a status signal from the pressure compensation mechanism. For example, the status signal may comprise information and/or data about a pressure in the interior of the rigid tank shell (relative to a pressure outside of the rigid tank shell), a pressure outside of the rigid tank shell, a position of the shutoff member, an opening degree or opening cross-sectional area of the shutoff member, or the like.

As a mere example, the pressure compensation mechanism can be configured to generate and transmit the status signal indicating the information about the shutoff member, such as a position of the shutoff member.

The pressure compensation mechanism and the controller can be connected to one another via a data bus, a network or other data exchange infrastructure.

In yet a further variant, the controller can be further configured to send a control signal to the pressure compensation mechanism. The pressure compensation mechanism can then be configured to receive the control signal and to move the shutoff member into a position corresponding to the control signal. Thus, the controller can control pressure equalization by controlling the shutoff member, particularly by controlling an open or closed position thereof.

This may facilitate pressure equalization, since the controller may be connected to a more general aircraft controller, so that flight status and/or flight operation data and/or cabin-related data may be used by the controller to control the pressure compensation mechanism. For example, the general aircraft controller may provide a signal indicating an increasing flight altitude and/or a decreasing cabin pressure, so that the controller may control the pressure compensation mechanism accordingly.

In another variant, the pressure compensation mechanism can further comprise a rupture disc configured to rupture, if a pressure difference between the inside and the surrounding environment of the rigid tank shell exceeds a threshold value. Such rupture disc allows a rapid pressure equalization. Rapid pressure equalization may be necessary, in case of a lack of cabin pressure or other reasons leading to a relatively large (positive or negative) pressure difference between the interior and exterior of the rigid tank shell. The threshold value, i.e. the relative pressure at which the rupture disc ruptures, can be chosen in such a manner that the rigid tank shell is not harmed due to the relative pressure difference between the interior and exterior of the shell.

The rupture disc may comprise an electrical contact or a sensor, which induce a signal recognisable at the controller, such as the lack of an electrical connection or a signal generated at the rupture disc. Thus, the controller is informed of the rupture of the disc and, hence, the unusual pressure difference and pressure compensation. The controller may then inform a personal working in the aircraft accordingly.

In yet another variant, the tank can further comprise at least one water level sensor configured to measure a water level in the rigid tank shell and to transmit a water level signal. For instance, the water level signal can be sent to the controller. The at least one water level sensor may comprise a continuous water level sensor measuring a water level over the entire height of the rigid tank shell, i.e., from zero to maximum, and/or a maximum water level sensor configured to output a signal only if the maximum water level in the rigid tank shell is reached (such as an overflow warning signal).

In a further variant, the tank can comprise a pump configured to pump water from the inside of the rigid tank shell to a water supply line. The water supply line may be connected to a water supply network or system connecting the water tank with one or more consumers of potable water. The water supply line, hence, is connected with the interior of the rigid tank shell, preferably at a bottom or sump of the rigid tank shell.

In yet a further variant, the tank can comprise an overflow port connected to an overflow line and configured to release water from the rigid tank shell, if a water level in the inside of the rigid tank shell exceeds a threshold. The threshold may be a maximum water line or fill level in the interior of the rigid tank shell. The overflow port may be used (activated) when the water filling process is not stopped in time. For instance, a hydraulically effective cross-section of the overflow port and overflow line should be larger than the hydraulically effective cross-section of the filling line/duct. This facilitates removing the air from the interior of the rigid tank shell, i.e. equalizing the pressure in the interior of the rigid tank shell constantly and particularly in case of overfilling the tank.

Optionally, the overflow port can fluidly connect the overflow line with a housing of the pressure compensation mechanism. Thus, the pressure compensation mechanism having an opening in the rigid tank shell may also be used to drain excess water in the tank. Moreover, the overflow port and overflow line (i.e., an overflow duct or the like) may also be employed to remove water from the interior of the rigid tank shell, in order to avoid a flooding of the aircraft fuselage.

In another variant, the overflow port can be configured to release air from the inside of the rigid tank shell, if the air inside the rigid tank shell exceeds a threshold pressure. In other words, the overflow port and/or overflow line can be used to remove excess air from the inside of the rigid tank shell, for example, when the shutoff member is in the first or second position. Thus, the overflow port and/or overflow line can be employed to guide water and/or air from the interior of the rigid tank shell to an exhaust port.

In yet another variant, the tank can further comprise at least one actuator configured to move the shutoff member between the closed position and the first open position and/or between the closed position and the second open position. The at least one actuator may be a spring-loaded actuator, a motor, a hydraulic or pneumatic actuator, a mechanically operated actuator (e.g. cable controlled actuator) or the like configured to be coupled to and move the shutoff member. As a mere example, a first actuator may be employed to move the shutoff member from its closed position to the first open position, while a second actuator different from the first actuator can be employed to move the shutoff member from its closed position to the second open position. It is to be understood that a single actuator may be used to move the shutoff member to any position.

According to a second aspect to better understand the present disclosure, an aircraft section comprises at least one tank according to the first aspect or one of its variants.

Furthermore, the aircraft section can also comprise a water consumer fluidly connected with the at least one tank and configured to receive water from the at least one tank. For instance, water can be pumped from the at least one tank to the water consumer and through a water pipe network.

In a variant, the aircraft section can further comprise a water connection configured to be connected to a water supply, and a fill valve configured to open and close a fluid connection between the water connection and the rigid tank shell. The water connection can be any connection in an interior space of the aircraft section and/or a connection that is accessible from an exterior of the aircraft section. Thus, by connecting a water supply, such as a hose or pipe of an exterior water supply station, to the water connection and with the fill valve opened, the rigid tank shell can be filled with water.

It is to be understood that the controller of the potable water tank can be employed to control the fill valve. As a mere example, the controller may receive a signal from the at least one water level sensor, and the controller then operates, on the basis of this signal, the fill valve, such as opening the fill valve to initiate the filling process and to close the fill valve and the filling process. Thus, an automatic filling of the potable water tank can be performed.

According to a third aspect to better understand the present disclosure, an aircraft comprises at least one tank according to the first aspect or one of its variants. Alternatively or additionally, the aircraft can comprise at least one aircraft section according to the second aspect or one of its variants.

The present disclosure is not restricted to the aspects and variants in the described form and order. Specifically, the description of aspects and variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

BRIEF DESCRIPTION OF THE DRAWINGS

In the following, the present disclosure will further be described with reference to example implementations illustrated in the figures, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
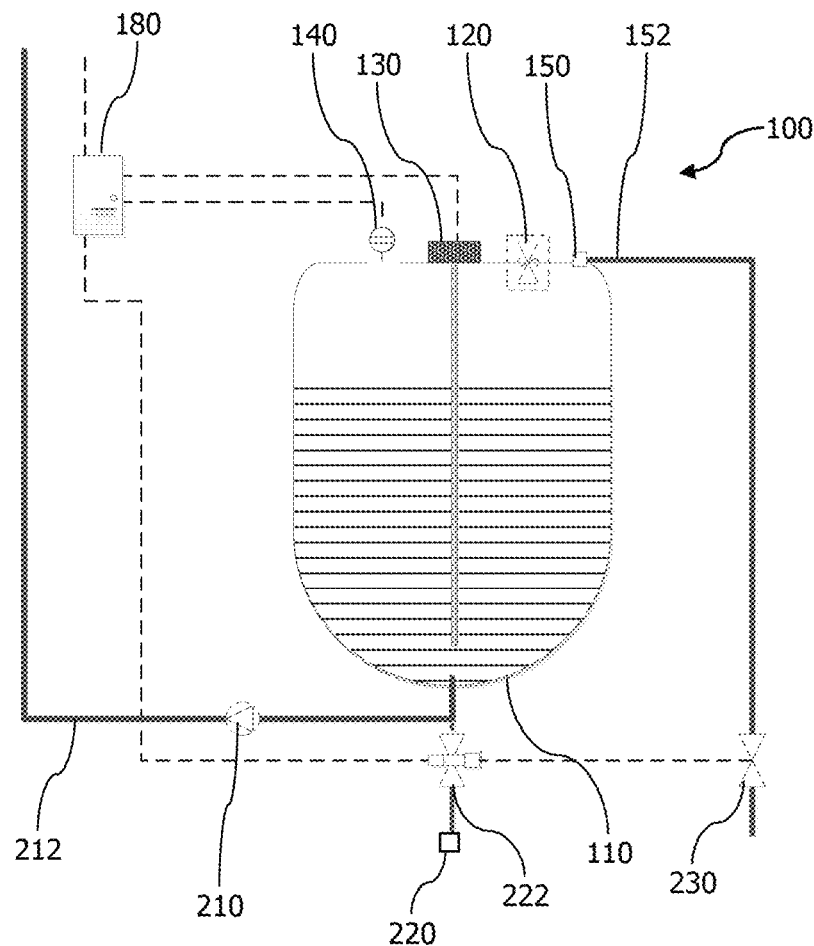
FIG. 1 schematically illustrates a potable water tank.

FIG. 1 schematically illustrates a potable water tank 100 comprising a rigid tank shell 110 configured to store a particular amount of potable water (illustrated as a hashed area in the interior of the rigid tank shell 110). The tank further comprises a pressure compensation mechanism 120, which is example illustrated as a valve. It is to be understood that the pressure compensation mechanism 120 can be implemented in any form fulfilling at least the here described capabilities.

The pressure compensation mechanism 120 is configured to equalize the pressure inside of the rigid tank shell 110 with the environment surrounding the rigid tank shell 110. The environment surrounding the rigid tank shell 110 can be a cargo or storage compartment of a vehicle 1 (FIG. 6) or may refer to the environment surrounding the vehicle 1 as will be explained further below. The pressure compensation mechanism 120 may be configured to open and close a fluid connection between the interior and the exterior of the rigid tank shell 110.

For example, the pressure compensation mechanism 110 comprises a shutoff member 122, 123 (for example illustrated in FIGS. 4 and 5) configured to move between a closed position, a first open position and a second open position. In the first open position, the shutoff member 122, 123 allows air to enter the rigid tank shell, i.e. from the surrounding environment into the tank. In the second open position, the shutoff member 122, 123 allows air to leave the rigid tank shell 110, i.e. out of the interior of the rigid tank shell 110.

Figure 2:
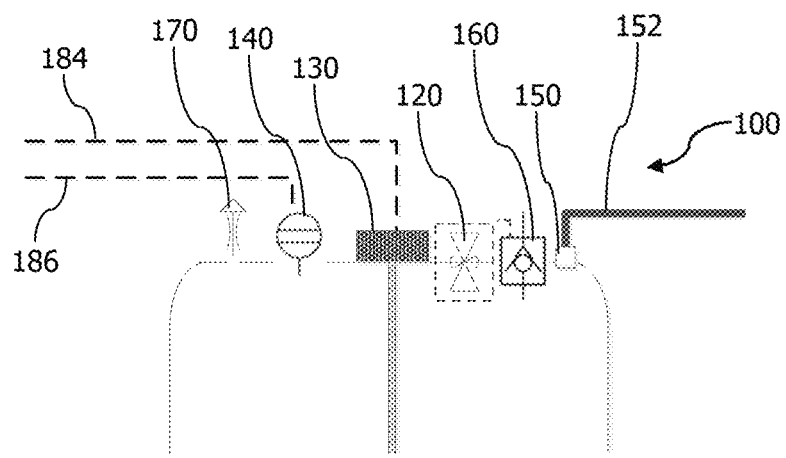
FIG. 2 schematically illustrates details of a variant of the potable water tank.
Figure 3:
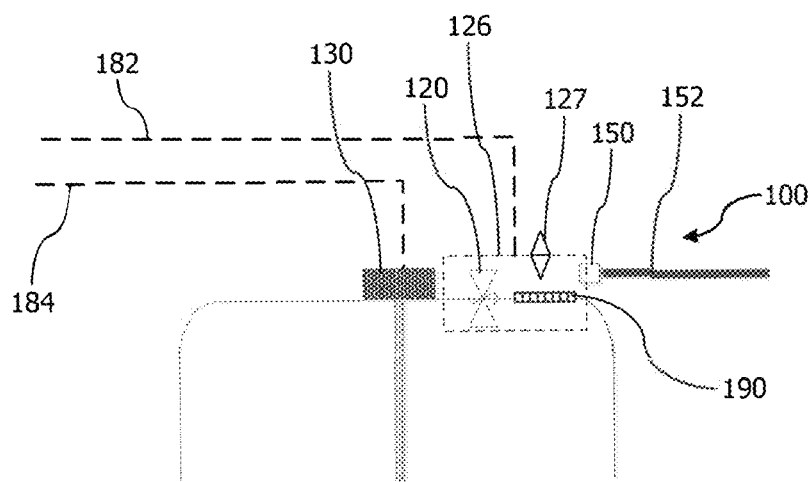
FIG. 3 schematically illustrates details of another variant of the potable water tank.

FIGS. 1 to 3 illustrate further features, which are each optional to the tank 100. Although each of FIGS. 1 to 3 illustrates one or more of these features, the present disclosure is not restricted to the illustrated combination of features. It is to be understood that the tank 100 can be equipped with one or more of the illustrated features irrespective of the particular drawing.

For example, the tank can comprise a controller 180 configured to receive a status signal from the pressure compensation mechanism 120. The controller 180 is connected with one or more or elements of the tank 100, that can generate and output a signal processable by the controller 180 or that can be controlled by the controller 180. Such signal lines to and from the controller 180 are illustrated in dashed lines in FIGS. 1 to 3, while not all possible signal lines are drawn for legibility of the drawings. As a mere example, a signal line 182 between the controller 180 and the pressure compensation mechanism 120 is not illustrated in FIG. 1, but shown in FIG. 3.

Another optional feature of the tank 100 can be a water level sensor 130 configured to measure a water level in the rigid tank shell 110. The water level sensor 130 may be configured to continuously measure a water level inside of the tank from empty to full. Such water level sensor 130 may reach over the entire height of the rigid tank shell 110, in order to detect a current water level. Alternatively, an ultrasonic, radar or similar sensor may be employed at the top of the rigid tank shell 110 that is capable of determining the fill level of the tank 100.

In addition or alternatively, a water level sensor 140 may be employed that is configured to measure a maximum water level in the rigid tank shell 110. In other words, maximum water level sensor 140 only generates a corresponding signal once the maximum water level inside of the rigid tank shell 110 is reached. The maximum water level sensor 140 may also be contemplated as a backup to water level sensor 130 for security reasons.

In order to fill the water tank 100, a water connection 220 and a fill valve 222 are optionally provided. The water connection 220 connects an interior of the rigid tank shell 110 with a water supply (not illustrated), while the fill valve 222 can be configured to open and close a fluid connection between the water connection 220 and the rigid tank shell 110. In FIG. 1 a fluid connection is provided between the fill valve 222 and a bottom or sump of the rigid tank shell 110 as one possible example.

In order to remove water from the tank 100, particularly to provide the water to a water consumer (not illustrated), a water supply line 212 and a pump 210 can be provided. The water supply line 212 may be connected to the fluid connection between the fill valve 222 and the rigid tank shell 110. Alternatively or additionally, the water supply line 212 may be connected to the fill valve 222, which in this case can be a shut-off valve or a three-way valve. In another optional example, the pump 210 is arranged inside of the rigid tank shell 110. Alternatively or additionally, the pump 210 can be combined with the fill valve 222. This may allow to use the pump 210 also to fill water from the water connection 222 into the rigid tank shell 110.

A further optional feature of the tank 100 can be an overflow port 150 configured to release water from the rigid tank shell 110, particularly if a water level in the interior of the rigid tank shell 110 exceeds a threshold level. The overflow port 150 can be connected to an overflow line 152, in order to remove the overflow water and to avoid flooding in the surrounding of the tank 100.

For instance, the overflow line 152 may connect the overflow port 150 (and hence the interior of the rigid tank shell 110) with an ambient, such as an environment or ambient of a vehicle 1 (FIG. 6) where the tank 100 is installed. Optionally, an overflow valve 230 may be installed in overflow line 152, in order to close overflow line 152, if required. As a mere example, the overflow valve 230 may be arranged at a border between an interior and exterior of a vehicle where the tank 100 is installed, so that the overflow line 152 can be blocked from the ambient. Since an atmosphere in the ambient may have a different pressure than the interior of the rigid tank shell 110 and/or the interior of the vehicle 1, the overflow valve 230 shall be closed to avoid a pressure equalization between the ambient atmosphere and the interior of the rigid tank shell 110, if it is not desired. The overflow valve 230 should be opened, for example, in case of filling water into the tank or when draining the tank, in order to allow ventilation (pressure equalization). In addition, the overflow valve 230 can be opened in the event of overfilling the rigid tank shell 110, in order to allow draining of the excess water.

Furthermore, the fill valve 222 may be mechanically connected to the overflow valve 230 (which mechanical connection is illustrated as a dashed line between both valves). For instance, if the fill valve 222 is opened, the overflow valve 230 is also opened. This allows filling the rigid tank shell 110, while equalizing the pressure inside of the rigid tank shell 110 with an environment (ambient) of the vehicle 1, in which the tank 100 is installed.

As a mere example, filling the tank 100 with water may begin with connecting a water supply to water connection 220 and opening the fill valve 222 (e.g., controlled by controller 180). The overflow port 150 regulates the air pressure inside of the rigid tank shell 110 by leaving the air out of the rigid tank shell 110. The at least one water level sensor 130, 140 sensor signal to the controller 180, which closes fill valve 222, if the intended fill level is reached. In case the overflow port 150 is blocked or otherwise closed, the pressure compensation mechanism 120 regulates the pressure inside of the rigid tank shell 110. The pressure compensation mechanism 120 may also send a signal to the controller 180 indicating a valve position or the like.

Draining the tank 100 can also be controlled by controller 180, e.g., by controlling valve 222 to open and releasing water through water connection 220. At the same time, overflow port 150 may be used to regulate the air pressure inside of the rigid tank shell 110, e.g. by allowing air to move into the rigid tank shell 110 through overflow line 152 and overflow port 150. In case the overflow port 150 is blocked or otherwise closed, the pressure compensation mechanism 120 regulates the pressure inside of the rigid tank shell 110. The pressure compensation mechanism 120 may also send a signal to the controller 180 indicating a valve position or the like.

Supplying water from tank 100 to a water consumer can also be controlled by controller 180, e.g., by controlling pump 210 pumping water into water supply line 212. The pressure compensation mechanism 120 regulates the pressure inside of the rigid tank shell 110. The pressure compensation mechanism 120 may also send a signal to the controller 180 indicating a valve position or the like.

In case of a rapid decompression (either inside of the tank 100 or in the surrounding of the tank 100), the pressure compensation mechanism 120 regulates pressure compensation by allowing air to enter or leave the rigid tank shell 110.

FIG. 2 illustrates details of a variant of the tank 100. The same features as in FIG. 1 are indicated by the same reference numerals and their description will be omitted, in order to avoid redundant explanations. Any of the features described with respect to FIG. 2 may also be employed in a tank as illustrated in FIG. 1 and vice versa.

For example, the tank 100 can further comprise a floating valve 160 configured to allow air to enter and exit the interior of the rigid tank shell 110. In case the water level in the tank 100 rises to a predetermined level, such as a water level close under or at the floating valve 160, a floating element of the floating valve 160 will be pushed by the water against an opening in the floating valve 160, thereby blocking the air passageway through this opening.

In other words, the floating valve 160 is a mechanical and non-controllable pressure compensation mechanism. Thus, the floating valve 160 can be integrated into the pressure compensation mechanism 120. For example, the floating valve 160 can form the shutoff member of the pressure compensation mechanism 120 or can be arranged besides the shutoff member 122, 123 in order to complement the functionality of the shutoff member 122, 123.

Moreover, the floating valve 160 is a further safety measure, for example during filling of the tank 100. For example, in case the overflow port 150 is blocked or otherwise closed, air can leave the rigid tank shell 110 during the filling process.

Further optionally, the tank 100 can comprise a check valve 170 configured to allow air to move out of or into the rigid tank shell 110, if a pressure difference between the interior and exterior of the rigid tank shell 110 exceeds a predetermined threshold. For example, the check valve 170 may comprise a spring element (not illustrated), which closes the check valve 170. If the pressure difference acting on a valve element induces a force on the spring element exceeding the closing force of the spring element, the check valve 170 automatically opens in a pure mechanical manner. Thus, a rapidly occurring pressure difference may be compensated faster and in an easier manner than with the pressure compensation mechanism 120 alone.

As a mere example, during draining of the tank 100, the check valve 170 may be a safety measure to allow air to enter the rigid tank shell 110. For instance, if the overflow port 150 is blocked or otherwise closed or in case the water drains faster than expected, the check valve 170 opens to allow air to enter the rigid tank shell 110.

Alternatively, the check valve 170 may be employed to regulate the pressure inside of the rigid tank shell 110 during water supply, i.e. when pump 210 is activated. In this case, the pressure compensation mechanism 120 may be employed as a safety measure or as an additional pressure compensation measure.

FIG. 2 further illustrates signal lines 184 and 186 connecting the water level sensors 130, 140 with the controller 180, respectively. Such signal lines may be employed to facilitate communication between the controller and the water level sensors 130, 140.

FIG. 3 illustrates details of another variant of the tank 100. The same features as in FIGS. 1 and 2 are indicated by the same reference numerals and their description will be omitted, in order to avoid redundant explanations. Any of the features described with respect to FIG. 3 may also be employed in a tank as illustrated in FIG. 1 or 2 and vice versa.

FIG. 3 illustrates a signal line 182 between controller 180 and pressure compensation mechanism 120. Such a signal line may be employed to facilitate communication between the controller and the pressure compensation mechanism 120, in both directions, since the pressure compensation mechanism 120 may generate data signals and may also receive data signals to be controlled.

The pressure compensation mechanism 120 is illustrated as comprising a housing 126. This housing 126 may provide a water tight housing of the entire pressure compensation mechanism 120, so that any water from an interior of the rigid tank shell 110 may enter an interior of the housing 126, but may be blocked from spreading in the surrounding environment of the tank 100. The housing 126 may be equipped with an air release mechanism 127, in order to allow air to leave and/or enter the rigid tank shell 110, when the pressure compensation mechanism 120 is in the first or second open position.

The pressure compensation mechanism 120 can comprise a rupture disc 190 configured to rupture if a pressure difference between the interior and surrounding environment of the rigid tank shell 110 exceeds a threshold value. For example, the rupture disc 190 may simply break, i.e., rupture, under the threshold pressure. This pressure may act on the rupture disc 190 in either direction, i.e. into or out of the tank 100. Thus, a rapid pressure equalization can be achieved, for example, in case of sudden pressure increase or decrease inside or outside of the rigid tank shell 110.

In the illustrated example of FIG. 3, the overflow port 150 is arranged at or in the housing 126 of the pressure compensation mechanism 120. Thus, the overflow port 150 can fluidly connect the overflow line 152 with an interior of the housing 126. As a mere example, if the rupture disc 190 breaks or in case the pressure compensation mechanism 120 releases air (or in rare and unintended cases water) from the interior of the rigid tank shell 110, this air (and/or water) can be released via overflow line 152. Of course, the housing 126 can be equipped with an air release mechanism 127, in order to allow air to leave and/or enter the rigid tank shell 110, when the pressure compensation mechanism 120 is in the first or second open position.

Figure 4:
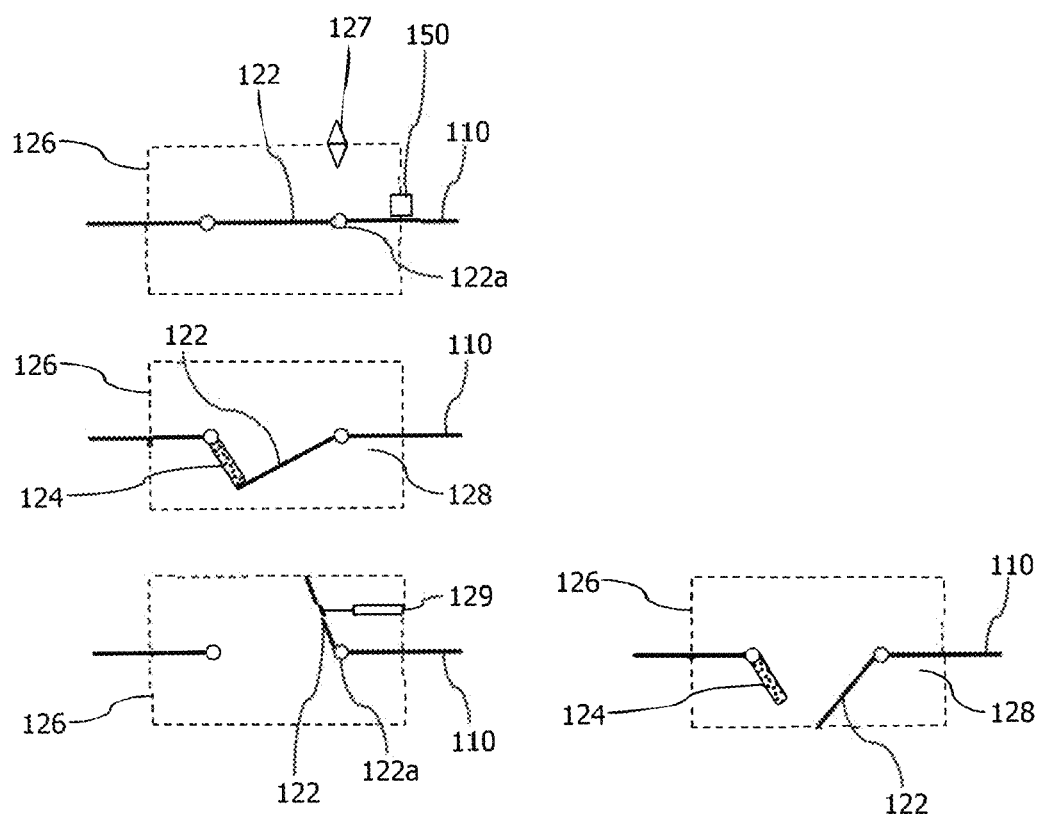
FIG. 4 schematically illustrates an example shutoff member in different positions.

FIG. 4 schematically illustrates an example shutoff member 122, 123 of the pressure compensation mechanism 120 in different positions. The shutoff member is illustrated as a flap 122, for example mounted to the rigid tank shell 110 via a hinge 122a arranged on one side of the flap 122. The flap 122 is configured to pivot in a first direction and a second direction. It is to be understood that any other form of shutoff member 122, 123 can be implemented, as long as the described functionality is achieved.

In the upper image in FIG. 4 the shutoff member 122 is in a closed position. For instance, the shutoff member 122 closes an opening in the rigid tank shell 110 in an airtight and watertight manner. This is particularly relevant to prevent water from unintentionally spreading out of the tank 100 through this opening, for example due to movement of the water in certain flight situations. The air release mechanism 127 is also schematically illustrated in the upper image in FIG. 4, but has been omitted in the other images of FIG. 4, for clarity reasons.

The middle image of the shutoff member 122 in FIG. 4 shows the shutoff member 122 in a first open position allowing air to enter the rigid tank shell 110. The first open position can exemplarily be achieved by moving the shutoff member 122 in a first direction, here towards an interior of the rigid tank shell 110.

The middle image of FIG. 4 additionally shows another optional feature, such as an actuator 128. This actuator 128, exemplarily illustrated as a spiral spring, can be configured to close the shutoff member 122, i.e., to move the shutoff member 122 into the closed position as illustrated in the upper image of FIG. 4. In case a pressure difference between the interior and exterior of the rigid tank shell 110 occurs, the shutoff member 122 can be pushed out of the way (i.e., out of the opening in the rigid tank shell 110) against the biasing force of the spring actuator 128. Once the pressure is equalized, spring actuator 128 brings the shutoff member 122 back into the closed position.

A further optional feature illustrated in FIG. 4 is an air filter 124 arranged to cover an opening evolving when the shutoff member 122 moves from the closed position to the first open position. For instance, the air filter 124 can be connected to the shutoff member 122 and/or the rigid tank shell 110, so that the air filter 124 covers the opening in the rigid tank shell 110. This allows air to enter the interior of the rigid tank shell 110, while any particles, dust or the like is prevented from reaching the water stored in tank 100.

In the bottom left image of FIG. 4 the shutoff member 122 is illustrated in a second open position allowing air to leave the rigid tank shell 110. Here, the flap-like shutoff member 122 is moved in an opposite direction from the closed position compared to the moving direction towards the first open position. The degree of opening of the shutoff member 122 may be larger in the second open position, so that the opening cross-section is also larger in the second open position than in the first open position. This may be particularly relevant, if a sudden pressure drop in the surrounding environment of the tank 100 occurs, or in case of a fast filling of the tank 100. The second open position of the shutoff member 122 allows a rapid pressure equalization, thereby avoiding high stresses on the rigid tank shell 110 due to an internal pressure.

Another optional feature is illustrated in bottom image of FIG. 4 in form of an actuator 129. The illustrated actuator 129 may be a motor, hydraulic or pneumatic actuator, a mechanical actuator (e.g., cable controlled actuator) or the like configured to control movement of the shutoff member 122. Although FIG. 4 illustrates the actuator 129 to move the shutoff member 122 into the second open position, it is to be understood that the actuator 129 can also move the shutoff member 122 towards the first open position (middle image of FIG. 4).

The actuator 129 can be controlled by controller 180, so that a pressure equalization/compensation can be actively controlled on the basis of any data available to controller 180.

It is to be understood that the pressure compensation mechanism 120 can comprise both actuators 128, 129, in order to facilitate uncontrolled and controlled movement of the shutoff member 122. Alternatively, the pressure compensation mechanism 120 may comprise only one or none of the actuators 128, 129.

In the bottom right image of FIG. 4, a further option is illustrated, where the shutoff member 122 moves to the second open position in the same direction as when moving to the first open position. This direction for example can be to the interior of the rigid tank shell 110. As illustrated (starting from the configuration of the middle image of FIG. 4) the shutoff member 122 can move away from the air filter 124, so that not only a degree of aperture increases from the first open position to the second open position, but also an unhindered air passageway is achieved for a fast pressure compensation. In other words, the shutoff member 122 moves into a position, where the air filter 124 can be bypassed by air streaming during the pressure compensation. This particular second open position may be employed in case of a pressure drop in the environment of the tank 100, i.e., when air has to leave the rigid tank shell 110. Moreover, this particular second open position may also be employed in case of a pressure drop in the interior of the rigid tank shell 110, for example, if the fill valve 222 accidentally opens, although the aircraft 1 flies at a high altitude and the pressure in the ambient environment of the aircraft 1 is less than in the interior of the rigid tank shell 110.

Figure 5:
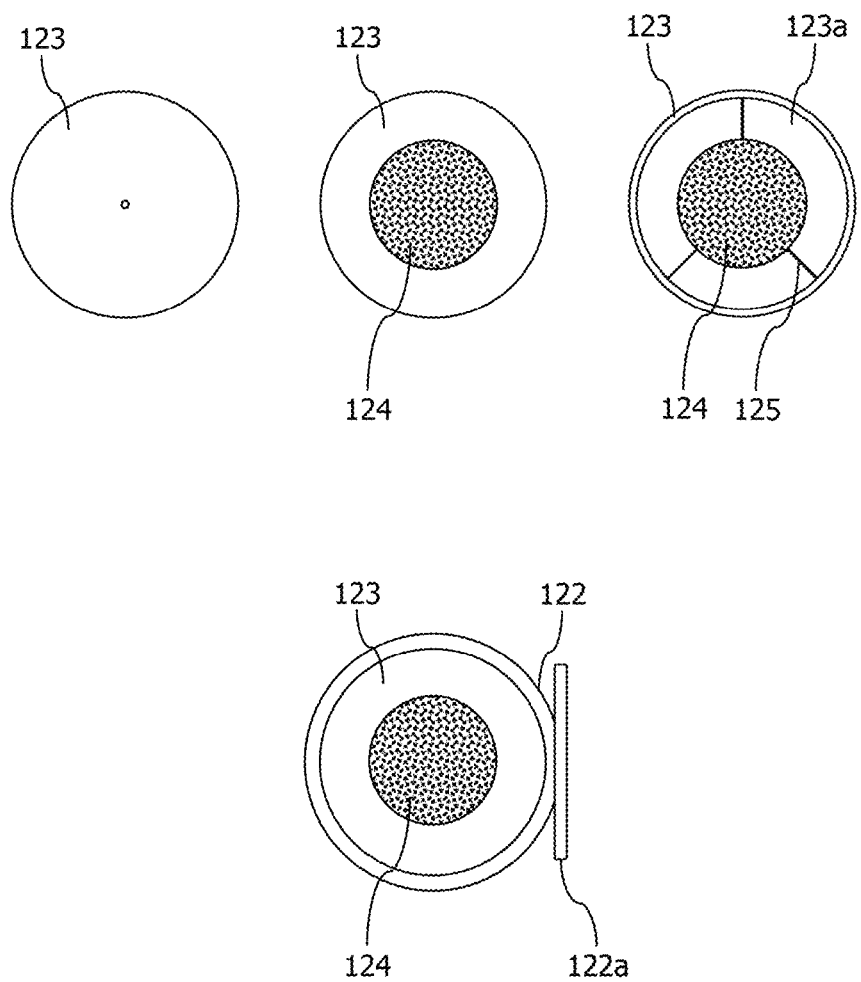
FIG. 5 schematically illustrates a further example shutoff member in different positions.

FIG. 5 schematically illustrates a further example shutoff member 123 in the form of a diaphragm mechanism 123. The upper images of FIG. 5, from left to right, show the diaphragm mechanism 123 in a closed position, a first open position and a second open position. Specifically, in the closed position, the shutoff member 123 is completely closed, so that an airtight and/or watertight closure is formed.

It is to be noted that FIG. 5 illustrates the inner edge of the diaphragm mechanism 123 as a small circle, in order to schematically illustrate this edge, although there is no opening at this small circle due to the airtight and/or watertight closure. In addition, the shutoff member 123 is placed in the rigid tank shell 110, which is not illustrated explicitly, but which is arranged around the outer circumference of the shutoff member 123.

In the first open position, the diaphragm mechanism 123 can be configured to open to a certain degree, i.e. to achieve a first degree of aperture. The upper middle image of FIG. 5 additionally illustrates the optional air filter 124. When moving the diaphragm mechanism 123 to the first open position, a degree of aperture may be achieved that corresponds to (or is slightly smaller than) the size of the air filter 124. For example, air entering the rigid tank shell 110 is filtered, so that no particles or dust or the like enters the tank 100.

In the second open position (upper right image of FIG. 5) the diaphragm mechanism 123 can move to a larger degree of aperture. This may expose the entire filter 124, which can, for example, be mounted to the shutoff member 123 and/or the rigid tank shell 110 via mounts 125. Thereby, an opening 123a of the shutoff member 123 is entirely opened. This allows air to leave or enter the rigid tank shell 110 in an easy manner. Specifically, since the air can bypass the air filter 124, and since the degree of aperture is larger than in the first open position, a larger flow of air can be achieved in the second open position.

FIG. 5 further illustrates, in the bottom image of FIG. 5, an example shutoff member 122, 123 comprising a flap 122 and a diaphragm mechanism 123. For example, the flap 122 can comprise a hinge 122a (as in FIG. 4) pivoting the flap 122 between the closed position and, for example, the second open position. The flap 122 comprises the diaphragm mechanism 123, i.e. the diaphragm mechanism 123 is arranged in or on the flap 122 and moves together with the flap 122 around hinge 122a. The diaphragm mechanism 123 is illustrated in the first open position, corresponding to the upper middle image of FIG. 5.

As illustrated in the bottom image of FIG. 5, the flap 122 can also comprise the optional air filter 124, which is arranged in an opening in the flap 122. The diaphragm mechanism 123 can close the opening in the flap 122 when moving to the closed position (like in the upper left image of FIG. 5). Furthermore, if the air filter 124 is not present, the diaphragm mechanism 123 in the first open position exposes an opening in the flap 122.

Figure 6:
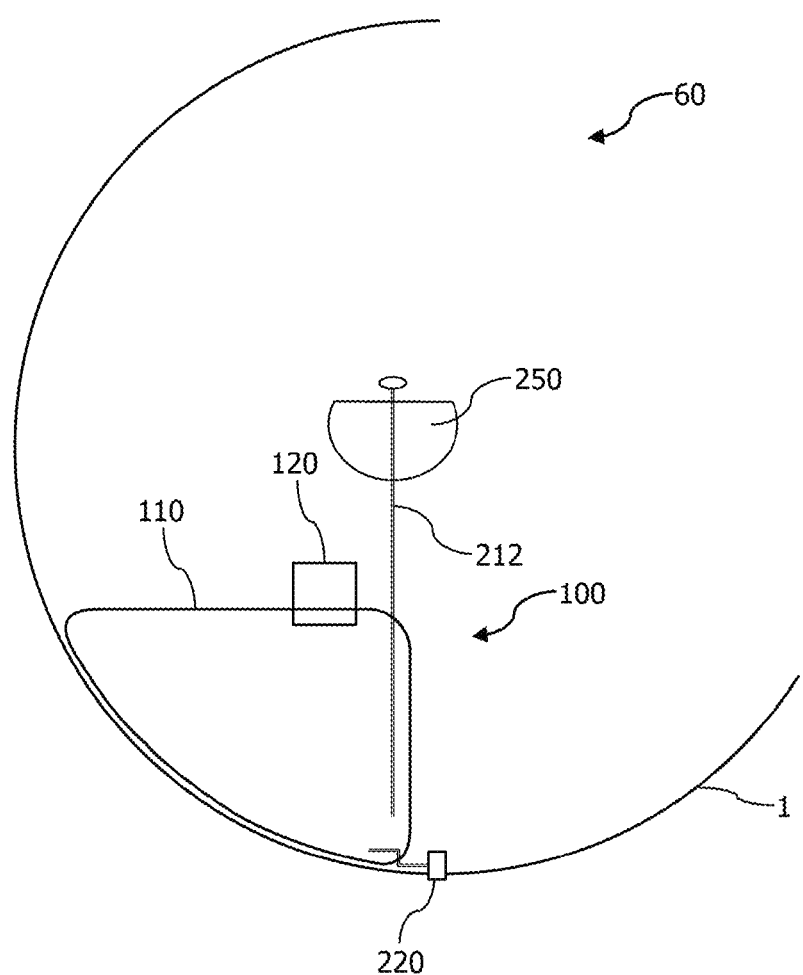
FIG. 6 schematically illustrates an example aircraft section.

FIG. 6 schematically illustrates an example aircraft section 60, particularly a bottom section of a cross-section of an aircraft 1. The aircraft section 60 can comprise at least one tank 100, such as the tank 100 illustrated in one of FIGS. 1 to 5. As shown in FIG. 6, the shape of the tank 100, particularly the shape of the rigid tank shell 110 can be adapted to the shape and form of the aircraft section 60. Thus, the tank 100 can be positioned in the aircraft section 60 in a space-saving manner and/or a volume of the rigid tank shell 110 can be optimized.

The aircraft section 60 may further comprise a water consumer, illustrated in FIG. 5 as a water supply line 212 and a sink 250. Moreover, the aircraft section 60 can comprise a water connection 220 configured to be connected to a water supply (not illustrated). For instance, the water connection 220 may be arranged at an outer skin of the aircraft 1, so that a water supply can be connected from an exterior of the aircraft 1 to the water connection 220. A fill valve 222 (FIG. 1) can be arranged and configured to open and close a fluid connection between the water connection 220 and the rigid tank shell 110.

Figure 7:
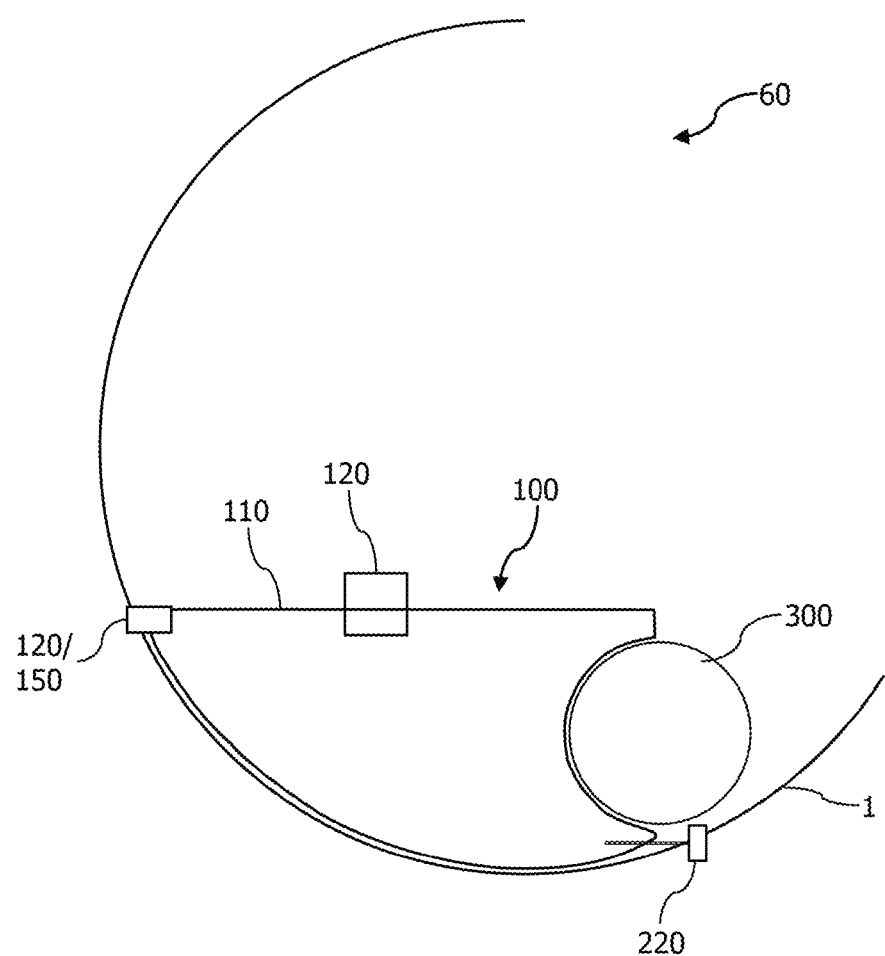
FIG. 7 schematically illustrates a further example aircraft section.

FIG. 7 schematically illustrates another example aircraft section 60, particularly a bottom section of a cross-section of an aircraft 1. The aircraft section 60 can comprise at least one tank 100, such as the tank 100 illustrated in one of FIGS. 1 to 5. As shown in FIG. 7, the aircraft section 60 can further comprise a further tank 300, such as a waste water tank 300. This further water tank 300 may be designed to withstand a continuous positive or negative pressure, such as a conventional pressurized tank 300 having a cylindrical and/or spherical shape.

The shape of the tank 100, particularly the shape of the rigid tank shell 110 can be adapted to the shape of the further water tank 300. For instance, the tank 100 of the present disclosure can be designed to at least partially surround the further water tank 300. In addition, the tank 100 can be adapted to the shape and form of the aircraft section 60. Thus, the tank 100 can be positioned in the aircraft section 60 and in the vicinity of other secondary structures of the aircraft 1 in a space-saving manner and/or a volume of the rigid tank shell 110 can be optimized to the installation space the tank 100.

FIG. 7 schematically illustrates a further optional feature, where the pressure compensation mechanism 120 is arranged at an outer skin of the aircraft 1. Specifically, the pressure compensation mechanism 120 penetrates the outer skin of the aircraft 1, so that pressure compensation can be achieved between the interior of the rigid tank shell 110 and the ambient environment of the aircraft 1.

It is to be understood that such configuration may alternatively or additionally be provided for the overflow port 150. This would save weight and installation costs for an overflow line 152.

It is believed that the advantages of the technique presented herein will be fully understood from the foregoing description, and it will be apparent that various changes may be made in the form, constructions and arrangement of the example aspects thereof without departing from the scope of the disclosure or without sacrificing all of its advantageous effects. Because the technique presented herein can be varied in many ways, it will be recognized that the disclosure should be limited only by the scope of the claims that follow.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A water tank for an aircraft, the water tank comprising:
a rigid tank shell; and
a pressure compensation mechanism configured to equalize a pressure inside of the rigid tank shell with an environment,
the pressure compensation mechanism comprising a shutoff member in a form of a flap that is pivotable about a hinge that connects the flap to the rigid tank shell, wherein the flap is configured to move between:
a closed position;
a first open position, which allows air to enter the rigid tank shell from the environment; and
a second open position, which allows air to leave the rigid tank shell and flow into the environment;
wherein, when the flap is in the first open position, the flap is opened inwardly, into the rigid tank shell, and, when the flap is in the second open position, the flap is opened outwardly, extending out of the rigid tank shell, such that a direction of movement of the flap from the closed position to the first open position is opposite a direction of movement of the flap from the closed position to the second open position; and
wherein, when the flap is in the first open position, the flap is positioned with a first degree of aperture and, when the flap is in the second open position, the flap is positioned with a second degree of aperture, which is larger than the first degree of aperture.

2. The water tank of claim 1, wherein the flap is hingedly attached to the rigid tank shell directly and only on one side of the flap.

3. The water tank of claim 1, wherein the pressure compensation mechanism comprises an air filter arranged to cover an opening evolving when the shutoff member moves from the closed position to the first open position.

4. The water tank of claim 1, comprising:
a controller configured to receive a status signal from the pressure compensation mechanism,
wherein the pressure compensation mechanism is configured to generate and transmit the status signal indicating a position of the shutoff member.

5. The water tank of claim 4, wherein:
the controller is configured to send a control signal to the pressure compensation mechanism; and the pressure compensation mechanism is configured to receive the control signal and to move the shutoff member into a position corresponding to the control signal.

6. The water tank of claim 1, wherein the pressure compensation mechanism further comprises a rupture disc configured to rupture when a pressure difference between the interior and a surrounding environment of the rigid tank shell exceeds a threshold value.

7. The water tank of claim 1, comprising at least one water level sensor configured to measure a water level in the rigid tank shell and to transmit a water level signal.

8. The water tank of claim 1, comprising a pump configured to pump water from inside the rigid tank shell to a water supply line.

9. The water tank of claim 1, comprising:
an overflow port connected to an overflow line and configured to release water from the rigid tank shell when a water level in inside the rigid tank shell exceeds a threshold,
wherein the overflow port fluidly connects the overflow line with a housing of the pressure compensation mechanism.

10. The water tank of claim 9, wherein the overflow port is configured to release air from inside the rigid tank shell when the air inside the rigid tank shell exceeds a threshold pressure.

11. The water tank of claim 1, comprising at least one actuator configured to move the shutoff member between the closed position and the first open position and or between the closed position and the second open position.

12. An aircraft section comprising:
at least one tank according to claim 1; and
a water consumer fluidly connected with the at least one tank and configured to receive water from the at least one tank.

13. The aircraft section according to claim 12, comprising:
a water connection configured to be connected to a water supply; and
a fill valve configured to open and close a fluid connection between the water connection and the rigid tank shell.

14. An aircraft comprising at least one tank according to claim 1.

15. An aircraft comprising at least one aircraft section according to claim 12.

16. A water tank for an aircraft, the water tank comprising:
a rigid tank shell; and
a pressure compensation mechanism configured to equalize a pressure inside of the rigid tank shell with an environment,
the pressure compensation mechanism comprising a shutoff member in a form of a diaphragm that is configured to control a size of an opening in the rigid tank shell, wherein the diaphragm has, for controlling whether the opening is open or closed, an aperture that is adjustable between:

a closed position, in which the opening is closed;
a first open position, in which the aperture has a first size for allowing air to enter the rigid tank shell from the environment; and
a second open position, in which the aperture has a second size for allowing air to leave the rigid tank shell and flow into the environment;
wherein the second size of the aperture is larger than the first size of the aperture;
wherein the shutoff member comprises a filter configured to prevent passage of contaminants and particulate matter from the environment into the rigid tank shell;
wherein the filter has an outer diameter that is smaller than an outer diameter of the diaphragm; and
wherein an outer diameter of the aperture, when the aperture is the first size, is a same as the outer diameter of the filter, such that all of the air passing from the environment into the rigid tank shell must pass through the filter when the aperture is the first size.

17. The water tank of claim 16, wherein the second size of the aperture is larger than the outer diameter of the filter, such that, when the aperture is the second size, a concentric annular passage is formed around an outer perimeter of the filter to allow a portion of the air passing from the rigid tank shell into the environment to bypass the filter.

18. A water tank for an aircraft, the water tank comprising:
a rigid tank shell; and
a pressure compensation mechanism configured to equalize a pressure inside of the rigid tank shell with an environment,
the pressure compensation mechanism comprising a shutoff member in a form of a flap that is pivotable about a hinge that connects the flap to the rigid tank shell, wherein the flap is configured to move between:
a closed position; and
a second open position, which allows air to leave the rigid tank shell and flow into the environment;
wherein the shutoff member comprises a diaphragm arranged in or on the flap, the diaphragm having an aperture that is adjustable between the closed position and a first open position, which allows air to enter the rigid tank shell from the environment through the aperture; and
wherein, when the flap is in the second open position, the flap is opened outwardly, extending out of the rigid tank shell.

19. The water tank of claim 18, wherein:
the shutoff member comprises a filter configured to prevent passage of contaminants and particulate matter from the environment into the rigid tank shell when the aperture of the diaphragm is in the first open position; and
the filter is positioned relative to the aperture such that, when the diaphragm is adjusted to be in the first open position, air flowing into the rigid tank shell through the aperture also passes through the filter.

\* \* \* \* \*